United States Patent [19]

Richter

[11] Patent Number: 5,378,948
[45] Date of Patent: Jan. 3, 1995

[54] ELECTROACTIVE MOTOR

[76] Inventor: Hans Richter, Ortlerstrasse 77, Augsburg, Germany, D-8900

[21] Appl. No.: 39,208

[22] PCT Filed: Aug. 13, 1992

[86] PCT No.: PCT/EP92/01860
§ 371 Date: Apr. 13, 1993
§ 102(e) Date: Apr. 13, 1993

[87] PCT Pub. No.: WO93/04505
PCT Pub. Date: Mar. 4, 1993

[30] Foreign Application Priority Data

Aug. 13, 1991 [DE] Germany ............... 4126667
Aug. 16, 1991 [DE] Germany ............... 4127163
Mar. 21, 1992 [DE] Germany ............... 4209230

[51] Int. Cl.⁶ .............................................. H01L 41/08
[52] U.S. Cl. .................................................. 310/328
[58] Field of Search .............. 310/316, 317, 323, 328; 318/116

[56] References Cited

U.S. PATENT DOCUMENTS

| | | | |
|---|---|---|---|
| 3,595,007 | 7/1971 | Baker | 310/328 X |
| 3,684,904 | 8/1972 | Galutva et al. | 310/328 |
| 4,613,782 | 9/1986 | Mori et al. | 310/323 |
| 4,622,483 | 11/1986 | Staufenberg et al. | 310/328 |
| 4,709,183 | 11/1987 | Lange | 310/328 |
| 4,727,278 | 2/1988 | Staufenberg et al. | 310/328 |
| 4,814,660 | 3/1989 | Yamada et al. | 310/328 |
| 5,001,382 | 3/1991 | Umeda et al. | 310/328 |
| 5,027,027 | 6/1991 | Orbach et al. | 310/317 |
| 5,027,028 | 6/1991 | Skipper | 310/328 |
| 5,041,753 | 8/1991 | Clark | 310/328 |
| 5,205,147 | 4/1993 | Wada et al. | 310/328 X |
| 5,237,236 | 8/1993 | Culp | 310/328 |
| 5,237,238 | 8/1993 | Berghaus et al. | 310/328 |

*Primary Examiner*—Mark O. Budd
*Attorney, Agent, or Firm*—Antonelli, Terry, Stout & Kraus

[57] ABSTRACT

An electroactive motor in which actuators move forward step by step between two elastically compressed surfaces.

11 Claims, 5 Drawing Sheets

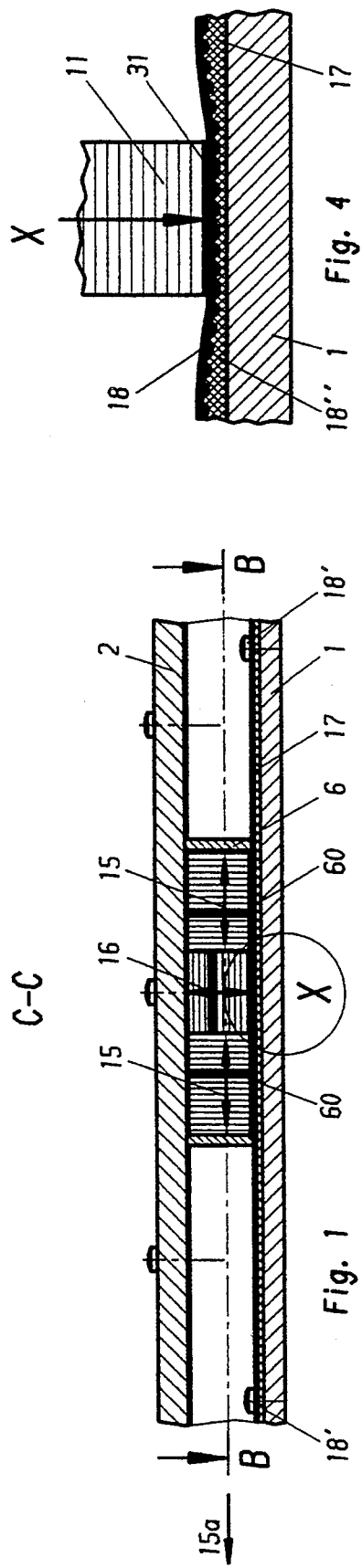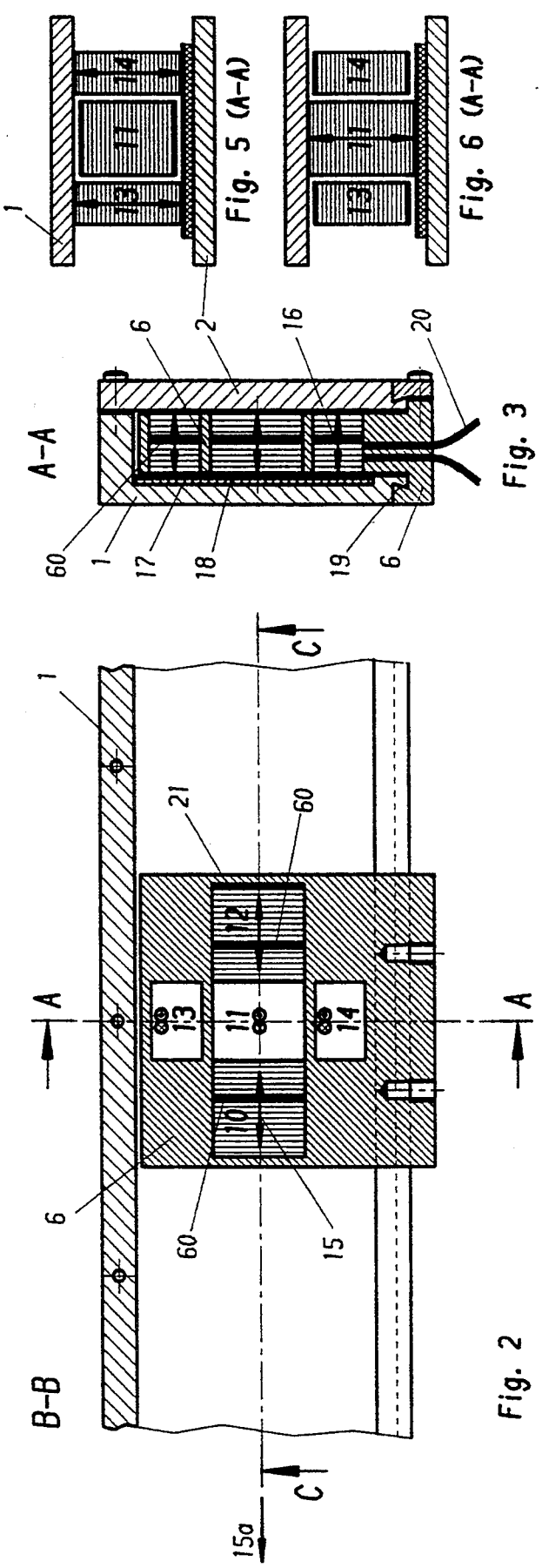

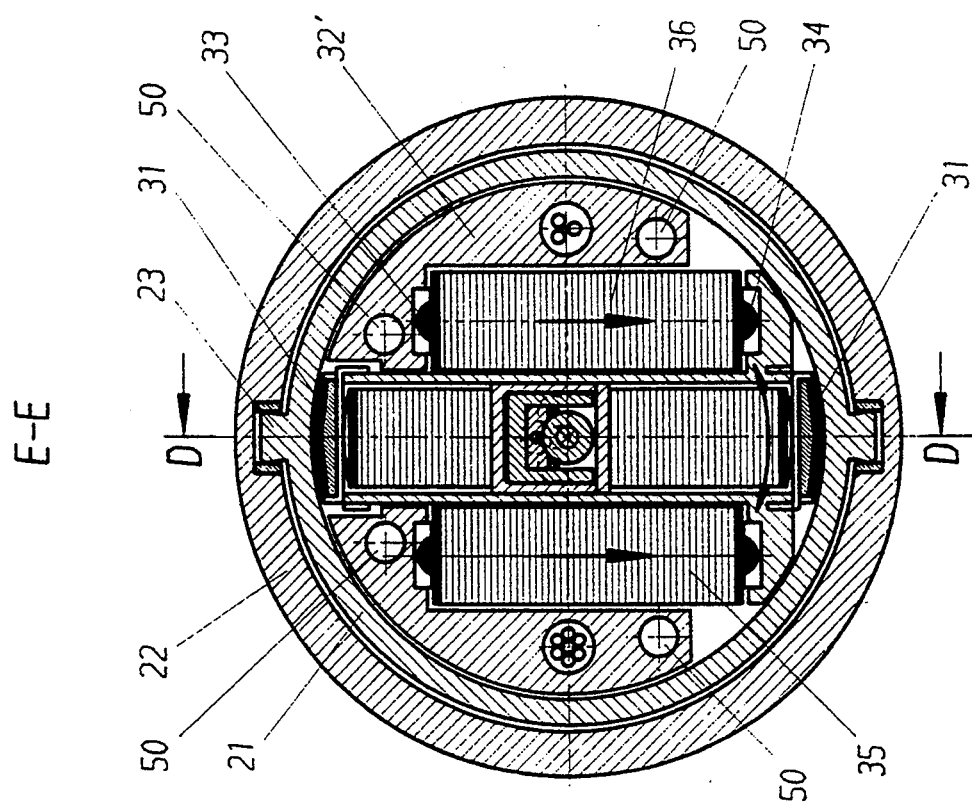
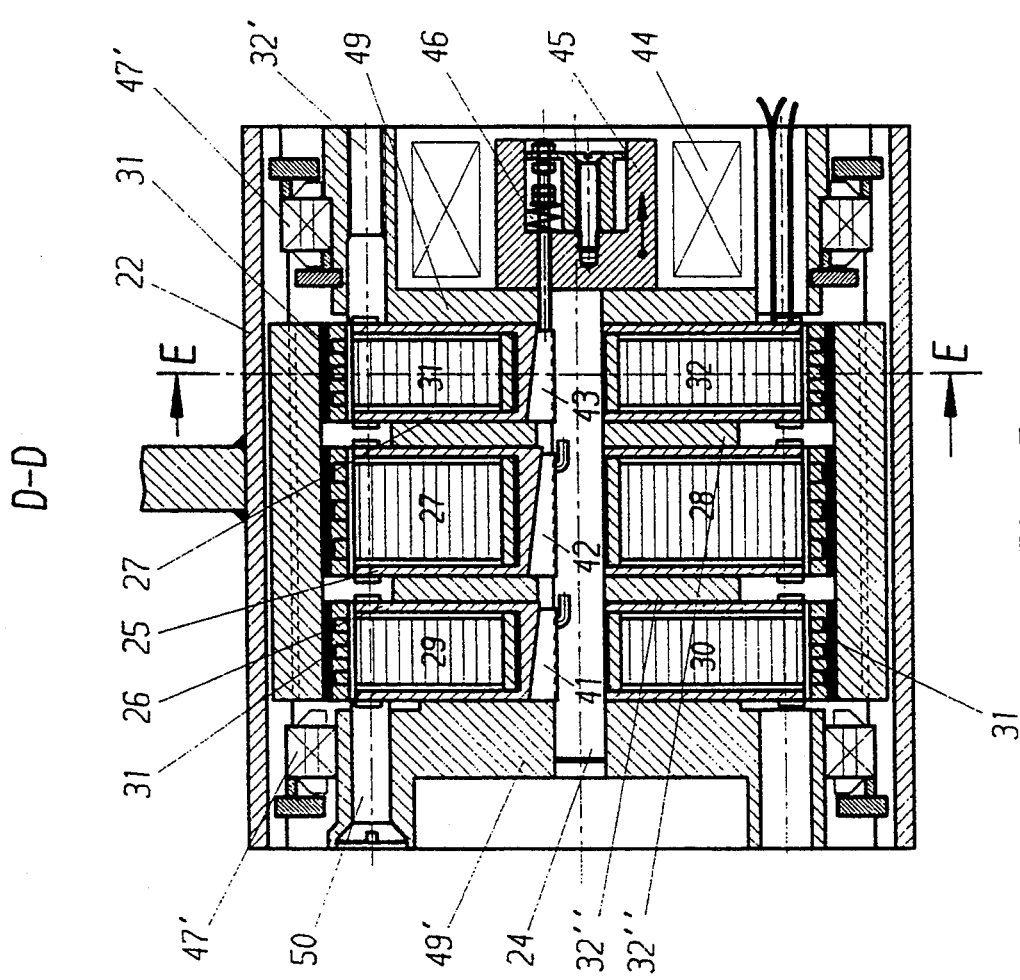
Fig. 8
Fig. 7

ELECTROACTIVE MOTOR

FIELD OF THE INVENTION

The invention relates to a method and apparatus for converting mechanical oscillations of electrically driven actuators into mechanical movements.

BACKGROUND TO THE INVENTION

Electromotors which convert electrical into mechanical energy by means of the electromagnetic principle have the disadvantage that there is electrical and mechanical inertia at the rotors.

Actuatorelectric drives in which either an inverted piezoelectric effect on polarized crystals, magnetostrictive effects or the like are used, lead one to expect low inertias. In such cases it is necessary to arrange actuators in series, in order to form a longer stroke from the oscillating travel of the actuators when alternating voltage is applied. Various suggestions have been made in this connection.

One of these suggestions hydraulically converts the slight stroke of an actuator into a longer stroke according to the principle of variable piston surfaces. The disadvantage of this suggestion, however, is that the overall size of the structure is excessive and the hydraulic unit easily begins to leak.

In so-called ultrasound motors, e.g. the rotary control drive described in patent publication EP 0 112 454 B1, the main problem is the mechanical wear at the contact point between piezoelectric crystal actuator and rotor which, in most cases, restricts its life or even makes operation impossible, particularly in small structures.

Low-wear surface coatings and soft intermediate layers were suggested which soften the hard impact of the actuator end on the rotor. However, the problems are not adequately solved with these structures.

The so-called inchworm motor also has disadvantages of this type. Two piezoelectric crystal sleeves are wedged in a round guide shaft, whereby a longitudinal piezoelectric crystal located between them ensures that a corresponding unclamped sleeve is advanced within the shaft. Its operation is quite heavily dependent on the wear between the piezoelectric sleeve and shaft.

It was also suggested that piezoelectric crystals be allowed to radially or angularly strike against a rotor in an oscillating manner. However tangential and radial oscillation amplitudes cannot be cleanly separated even at the control side and, therefore, additional wear results.

The very slight stroke of the actuators is easily offset by play and wear in the mechanical arrangement and the device thus made ineffective. Otherwise, the structure must be made appropriately rigid and precise and is thus expensive.

These problems occur in linear motors, as well as in rotary motors and piezoelectric crystals and also when using other actuators.

An object of the invention is to improve an actuatorelectric motor and its electronic control in such a way that these disadvantages are eliminated.

SUMMARY OF THE INVENTION

In accordance with an embodiment of the invention, in a method for converting mechanical oscillations of electrically driven actuators into mechanical movements, actuators move forward in steps between two elastically prestressed surfaces of an output drive element.

BRIEF INTRODUCTION TO THE DRAWINGS

Embodiments of the invention are described in greater detail below with reference to the following drawings, in which:

FIG. 1 is a section C—C through a linear motor
FIG. 2 is a section B—B through a linear motor
FIG. 3 is a section A—A through a linear motor
FIG. 4 is a detail from a linear motor
FIGS. 5 and 6 are a basic diagram from a linear motor
FIG. 7 is a section D—D through a rotary motor
FIG. 8 is a section E—E through a rotary motor
FIG. 9 is a cut of a rotary motor combined with a drive
FIGS. 10-17 are phase diagrams of a rotary motor
FIGS. 18 and 19 are a frequency diagram of a rotary motor
FIG. 20 is a circuit diagram of control electronics for actors
FIG. 21 is a cut-off diagram

DETAILED DESCRIPTION OF THE INVENTION

Figure 9:
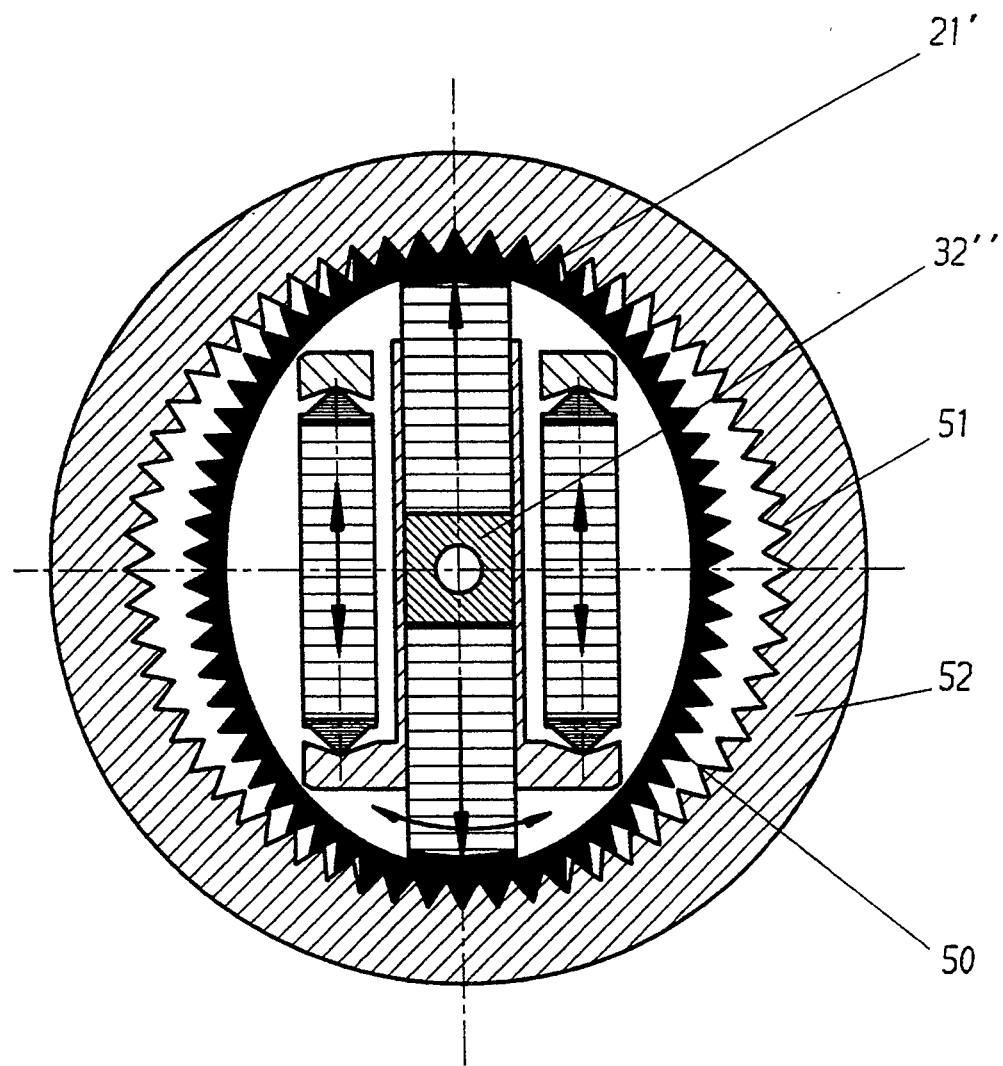
Figure 10:
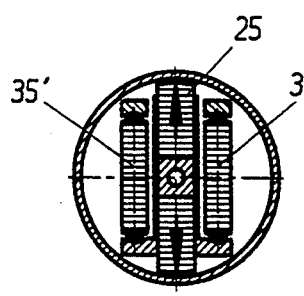
Figure 11:
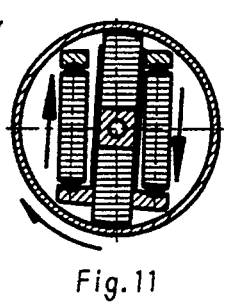
Figure 12:
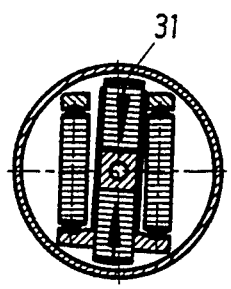
Figure 13:
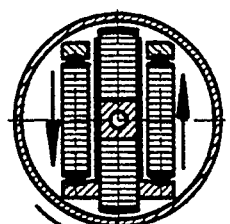
Figure 14:
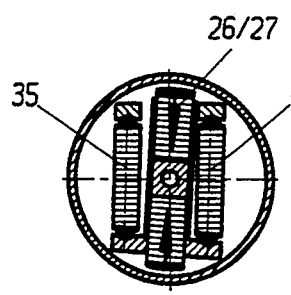
Figure 15:
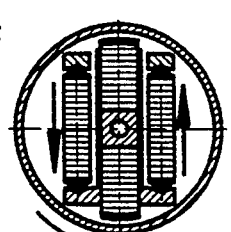
Figure 16:
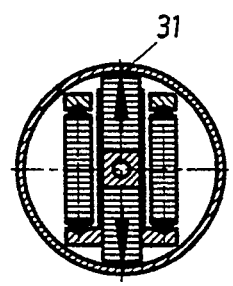
Figure 17:
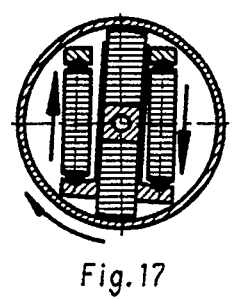

In FIGS. 1-6, a cover plate 2 is situated opposite a base plate 1. Both represent the stator of the linear motor and thus a guide rail having any length desired. Armature 6 slides between base plate 1 and cover plate 2. Three actors 11, 13, 14, which expand in direction of arrow 16 when voltage is applied, and two actors 10 and 12, which expand in direction of arrow 15 when voltage is applied, are located in the armature 6. Actors 13 and 14 are only half as wide as actor 11.

Actors 11, 13 and 14 have a thin friction lining on the surface facing the cover plate 2 and base plate 1. A flat spring strip 18 with a rubber strip 17 vulcanized in between them is fastened to the base plate 1 and secured with screws 18'.

Armature 6 is guided in a sliding manner by dovetail guides 19 in cover plate 2 and base plate 1.

By prestressing base plate 1 and cover plate 2, the rubber strip 17 which has been vulcanized in and the steel spring band 18 are compressed by the unexpanded actuators 11, 13, 14 over their area (FIG. 4), so that they are constantly under surface pressure. When the actuators 11, 13, 14 are expanded, the compression increases. The steel spring band 18 is connected to the base plate 1 at the beginning and end of the base plate 1 so as to be tension-proof. It is toothed diagonally to the feed direction 15a on its side facing the rubber layer 17, so that it is flexurally slack in this direction and resistant to bending in cross direction.

Actuators 10, 11 and 12 are fitted into armature 6 in such a way that they are slidable in the direction of arrow 15a in armature 6 by the mechanical lift of an actuator 10 or 12. The elastic disk 21 is provided as compensation. Actuators 11 and 12 are supported on actuator 11 or armature 6, respectively.

When actuators 11 is acted upon by voltage, it further compresses the rubber strip 17 via steel spring band 18, so that actuators 13 and 14 are released (FIG. 6) and can move freely. When actuators 13 and 14 are acted upon by voltage, the same occurs (FIG. 5) and actuator 11 can move freely.

If armature 6 is now moved in the direction of arrow 15a, then the individual actuators are supplied with power via cable 20 and are controlled as follows:

a.
   expand actuator 11, it wedges tightly.
   expand actuator 10
contract
   actuator 12 by the same lift
   actuation results:
   armature 6 advances
   actuators 13 and 14 advance
b.
   actuators 13 and 14 expand, and wedge tightly.
   actuator 11 contracts, and unclamps.
   actuator 10 contracts
   actuator 12 expands by the same lift
   as a result of which:
   actuator 11 advances In this case, the respectively expanded actuators 11 or 13 and 14 always support armature 6 vis-à-vis the guide rails 1 and 2 via their friction linings 31 and take over feeding power.

The desired linear movement results from the repeating control sequences a. and b. The direction can be determined by changing the sequence appropriately.

The rotary motor in FIGS. 7 and 8 works, in essence, like the linear motor. Instead of the rubber strip 17 and the steel spring band 18, it has the cylinder 21, prestressed in an elliptically spring-like manner by actuator columns 25, 26 and 27, the cylinder 21 being torsionally mounted so as to slide radially with two adjusting springs 23 in corresponding grooves of the housing 22. Cylinder 21 is already elliptically deformed in an unexpanded state by actuator columns 25, 26 and 27 and is then further deformed by the actuator lift.

The motor output part 32 is pivoted with ball bearings 47 and 47' in housing 22. The motor output part 32' is comprised of both flanges 49 and 49', connections 32' and partitions 32" which are held together by adjustable bolts 50.

Actuator columns 25, and opposite thereto, actuator columns 26 and 27 oscillate about the centre of the cylinder 21 on shaft 24. Actuator columns 25 each contain 2 actuators, dependent on the construction, which work together via a structural bridging of shaft 24. When actuators 27 and 28 expand, then they press cylinder 21 even more elliptically via their friction lining 31 and release actuators 31, 32, 29 and 30, so that these can oscillate freely.

Actuator columns 26 and 27, and opposite thereto, 25 are set swinging by oscillating actuators 35 and 36, mounted on the one hand in the ball bearings 33 in motor output part 32' and on the other hand in ball bearing 34 in the actuator columns 25, 26, 27. There are, of course, also corresponding oscillating actuators 35' and 36' for actuator columns 25 and 27, but these are not shown.

Figure 18:
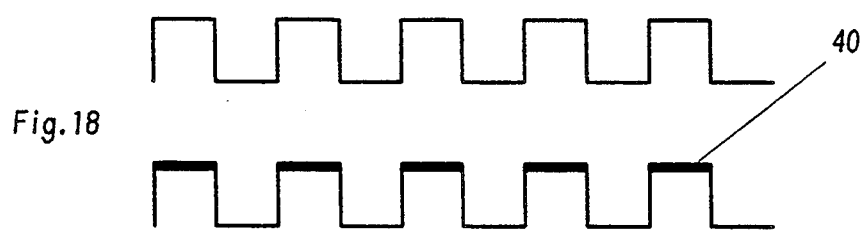
Figure 19:
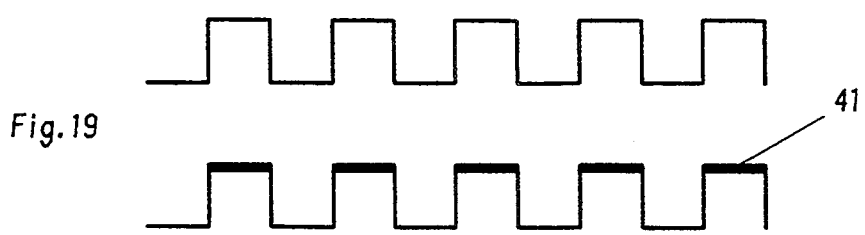

As a result of the cyclical control of the, in total, 12 actuators in the rotary motor, FIGS. 7 and 8, the motor output part rotates as per FIGS. 10-17. Lines 40 and 41 in the diagrams FIG. 18 and FIG. 19 show the desired rotation resulting from the individual runs of the actors in the cylinder 21.

Settling and wear in the actuators 27-32 and 11, 13 and 14 are compensated by the spring reset path of cylinder 21 or by steel spring band 18 and rubber layer 17 and of oscillating actuators 35, 36, 35' and 36' by the spring-coupling keys 41, 42, 43, which are constantly drawn outward, when in operation, by a magnetic coil 44 and an armature 45 and, at rest, back again by pressure spring 46.

In the method of the invention, at least 3 expansion actuators are adjacent to the one another diagonally to direction of feed, whereby they are supported, constantly alternating, first the middle one, then the two outer ones, on an elastically prestressed output element. Feed actuators, which act in the direction of feed, produce the feed power thereby so that they support themselves between the respectively wedged expansion actuator(s) and the armature. The respectively retracted expansion actuator is thus without load and can swing back without friction in the free space held open by the other expansion actuator.

The actuators are thus secured against breakage since they always strike against a damping element instead of against a hard rotor. The wear between friction lining 31 and the elastic output element is also minimized, since the expansion actuators and the oscillating actuators are completely electronically controlled, separately, without overlapping. In addition, the elastically prestressed output element also perhaps automatically compensates wear since it always immediately restores. Furthermore, only low-wear static frictions occur, and not high-wear sliding frictions, and the static friction surfaces can be made rather large, so that the relative surface pressure is low.

According to an embodiment of the invention, the elastic cylinder 21 can also have external teeth 50, as in FIG. 9, with which it rollingly engages in internal teeth 51 in support 52, whereby the external teeth have at least 2 more teeth. The motor output part 32" must be rotating in this embodiment and the power supplied by collectors. These drives, which have become known as harmonic drive, enable a large momentary gearing in connection with the actorelectric motor of the invention.

Figure 20:
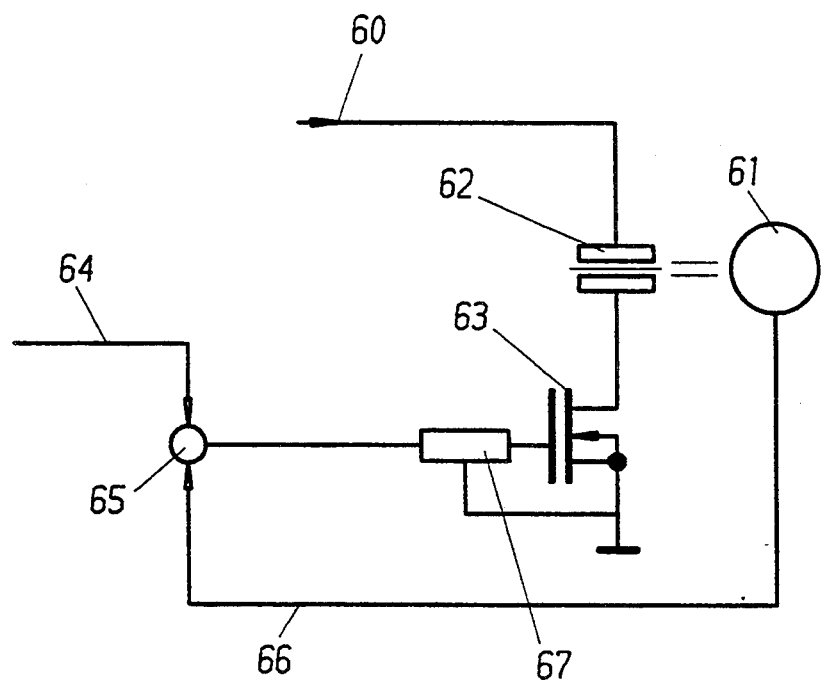

In FIG. 20: 60' is Vmax, 61 is an odometer, 62 a piezoelectric actuator, 63 is an output MOS FET, 64 a desired lift signal, 65 is a desired/actual comparator, 66 an actual lift signal, 67 is a cut-off device.

Figure 21:
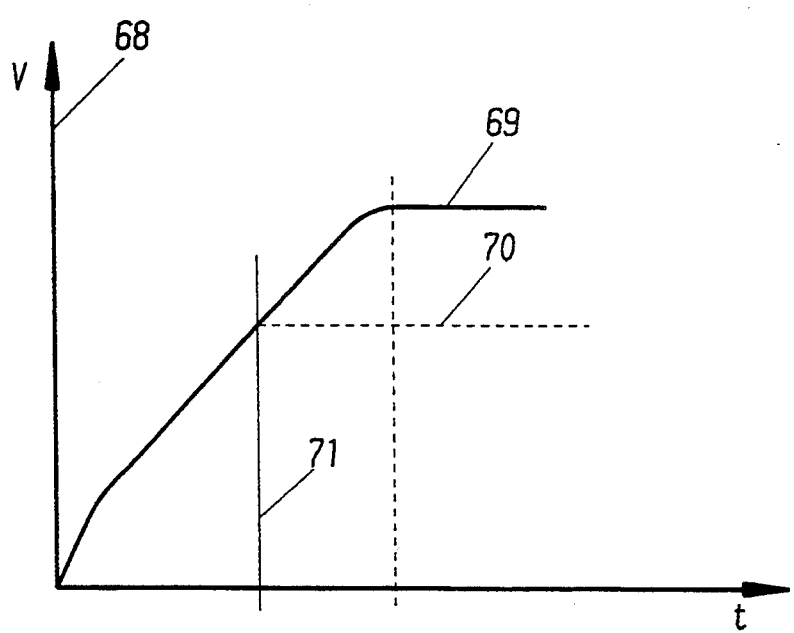

In FIG. 21: 68 is a V lift axis, 69 is a Vmax=max. lift curve, 70 is partial lift level, 71 is a cut-off point.

Preferably, according to the invention, piezoelectric actuators are used. As these represent an electric capacitor with considerable capacity, the piezoelectric actuator is acted upon with energy via a quick-break switch, such as e.g. output MOS-FET 63. The voltage applied corresponds to the voltage for the full lift of the piezoelectric actuator. Since the piezoelectric actuator acts as an electrical integral, the lift is integratedly carried out over the time of the piezoelectric actuator. The lift is measured via an odometer system or integratingly via a piezoelectric sensor disk in the piezoelectric actuator itself. If the piezoelectric sensor has passed through the desired path, the energy supply is switched off. This disconnecting process must take place quickly enough in order to maintain the lift in the path/tolerance limit. A MOSFET output signal in connection with disconnecting steps such as reduction of the gate-source voltage after the MOSFET has been passed through to the hold voltage make this possible. A pressure-sensitive sensor disk 60 can also be used as odometer system, from the signal of which a path signal is produced via integration.

I claim:

1. A stepping motor comprising plural expansion actuators positioned between opposite surfaces of a stator, a resilient flexible material interposed between said actuators and one surface of said stator, means for holding the actuators between the other of said surfaces and said material, and means for expanding said actuators alternately and cyclically against said other of said surfaces and said material, said flexible material being comprised of a flexible steel band having a toothed underside, said band being vulcanized to said one surface by means of an elastic rubber layer.

2. A stepping motor as defined in claim 1, including second resilient flexible material interposed between said actuators and the other of said surfaces, said second resilient flexible material being comprised of a flexible steel band having a toothed underside, and being vulcanized to the other of said surfaces by means of an elastic rubber layer.

3. A stepping motor comprising at least three expansion actuators positioned between surfaces of a stator, a resilient flexible material interposed between said actuators and one of said surfaces, means for holding the actuators between the other of said surfaces and said material in a direction orthogonal to an advancing direction, and means for expanding said actuators alternately cyclically, whereby they are advanced in a stepwise manner in said advancing direction.

4. A stepping motor as defined in claim 3, including a resilient flexible material interposed between said actuators and another of said surfaces.

5. A stepping motor as defined in claim 4, in which at least one of said resilient flexible material is comprised of a flexible steel band having a toothed underside, and being vulcanized to a corresponding one of said surfaces by means of an elastic rubber layer.

6. A stepping motor as defined in claim 5, in which alternately, two outer actuators expand together and an inner actuator expands alone.

7. A stepping motor comprising plural expansion actuators positioned between opposite portions of a surface of a circular drive element, a resilient flexible material in the form of an elliptically compressed cylinder interposed between said actuators and said surface, said cylinder torsionally engaging with said opposite surface portions by means of tongue and groove means, and means for expanding said actuators alternately and cyclically whereby one of said drive element and said actuators is advanced.

8. A stepping motor as defined in claim 7 in which said opposite portions are located on a circular inner periphery of said drive element.

9. A stepping motor as defined in claim 7, including an armature which is tiltable about its middle point located in the centre of the cylinder interfacing said actuators.

10. A stepping motor as defined in claim 9, including a cylinder elliptically compressed by the armature, having external teeth which engage internal teeth of said drive element, and having at least two more teeth than said drive element, the armature being pivotable.

11. A stepping motor as defined in claim 7, further including expansion actuator columns having magnetically operated and spring-return coupling keys adjacent their central axes for compensating for play of said actuators.

* * * * *